(12) United States Patent
Setlak et al.

(10) Patent No.: US 6,785,408 B1
(45) Date of Patent: Aug. 31, 2004

(54) FINGERPRINT SEGMENT AREA PROCESSING METHOD AND ASSOCIATED APPARATUS

(75) Inventors: Dale R. Setlak, Melbourne, FL (US); Barbara E. Cornett, Melbourne Beach, FL (US)

(73) Assignee: Authentic, Inc., Melbourne, FL (US)

( * ) Notice: Subject to any disclaimer, the term of this patent is extended or adjusted under 35 U.S.C. 154(b) by 0 days.

(21) Appl. No.: 09/567,644

(22) Filed: May 9, 2000

Related U.S. Application Data

(60) Provisional application No. 60/133,589, filed on May 11, 1999, now abandoned.

(51) Int. Cl.[7] .............................................. G06K 9/00
(52) U.S. Cl. ...................................... 382/125; 340/5.83
(58) Field of Search ................................ 382/115, 116, 382/124, 125; 283/681; 356/71; 340/5.52, 5.53, 5.82, 5.83, 5.84; 707/2, 6, 7; 704/273; 396/15

(56) References Cited

U.S. PATENT DOCUMENTS

| | | | |
|---|---|---|---|
| 3,859,633 A | 1/1975 | Ho et al. ................. | 340/146.3 |
| 3,893,080 A | 7/1975 | Ho et al. ................. | 340/146.3 |
| 4,151,512 A | 4/1979 | Riganati et al. ......... | 340/146.3 |
| 5,040,224 A | 8/1991 | Hara ...................... | 382/4 |
| 5,140,642 A | 8/1992 | Hsu et al. ................ | 382/5 |
| 5,465,303 A | 11/1995 | Levinson et al. .......... | 382/124 |
| 5,828,773 A | 10/1998 | Setlak et al. ............. | 382/126 |
| 5,841,888 A | * 11/1998 | Setlak et al. ............. | 382/124 |
| 5,845,005 A | 12/1998 | Setlak et al. ............. | 382/124 |
| 5,862,248 A | 1/1999 | Salatino et al. ........... | 382/124 |
| 5,963,679 A | * 10/1999 | Setlak ...................... | 382/312 |

* cited by examiner

*Primary Examiner*—Samir Ahmed
(74) *Attorney, Agent, or Firm*—Allen, Dyer, Doppelt, Milbrath & Gilchrist, P.A.

(57) ABSTRACT

An apparatus and method for enrolling at least one fingerprint and determining a match of a new fingerprint thereto uses data related to fingerprint ridge flow for matching a desired area segment of a new fingerprint to a corresponding area segment stored in a database. The apparatus generates and stores enrollment data based upon fingerprint ridge flow over a plurality of area segments for the at least one fingerprint, senses a new fingerprint, and generates sensed data based upon fingerprint ridge flow of the new fingerprint over at least one desired area segment of the plurality of area segments. The method also preferably includes comparing the enrollment data and sensed data to determine whether the new fingerprint matches an enrolled fingerprint. The generating of sensed data preferably comprises identifying and generating sensed data for only a single desired area segment in one embodiment. In another embodiment, a plurality of area segments are identified and processed to achieve a desired performance.

35 Claims, 7 Drawing Sheets

FINGERPRINT SEGMENT AREA PROCESSING METHOD AND ASSOCIATED APPARATUS

RELATED APPLICATION

This application is based upon prior filed provisional application Serial No. 60/133,589 filed May 11, 1999 now abandoned.

FIELD OF THE INVENTION

The invention relates to the field of fingerprint processing, and, more particularly, to the field of creating a database of fingerprint data and matching a new fingerprint to the database.

BACKGROUND OF THE INVENTION

Fingerprint matching is a reliable and widely used technique for personal identification or verification. In particular, a common approach to fingerprint identification involves scanning a sample fingerprint or an image thereof, converting it into electrical signals, and storing the image and/or unique characteristics of the fingerprint image. The characteristics of a sample or new fingerprint may be compared to information for reference fingerprints already in storage to determine or verify a person's identity.

Unfortunately, comparing a sample fingerprint to a large number of reference fingerprints may be prohibitively expensive and/or simply take too long. Accordingly, fingerprints are typically classified into a plurality of discrete sets and/or subsets in the form of a hierarchical tree to thereby expedite searching. For example, a common top level classification for fingerprints usually differentiates the prints into the classes of: plain whorl, plain loop, tented arch, etc. based upon broad ridge pattern types. These classes may be yet further divided into subclasses. Accordingly, a fingerprint sample to be searched, once itself classified, can be more efficiently compared to only those prints in the respective classes and subclasses of the search tree. For example, U.S. Pat. No. 5,465,303 to Levison et al. describes both the widely used Henry classification system and the Vucetich classification system.

When the quality of the original copy of a fingerprint is bad, the print may contain many local distortions of the ridge pattern which may result in incorrect orientation of the fingerprint. U.S. Pat. No. 5,140,642 to Hsu et al. is directed to a method for determining the actual position of a core point of a fingerprint based upon finding ridge flows and assigning a direction code, correcting the ridge flows, and allocating the core point based upon the corrected direction codes. Along these lines, U.S. Pat. No. 5,040,224 to Hara discloses an approach to preprocessing fingerprints to correctly determine a position of the core of each fingerprint image for later matching by minutiae patterns.

Fingerprint minutiae, the branches or bifurcations and end points of the fingerprint ridges, are often used to determine a match between a sample print and a reference print database. For example, U.S. Pat. Nos. 3,859,633 and 3,893,080 both to Ho et al. are directed to fingerprint identification based upon fingerprint minutiae matching.

U.S. Pat. No. 4,151,512 to Riganati et al. describes a fingerprint classification method using extracted ridge contour data. The ridge flow in the fingerprint pattern and minutiae data are identified and extracted from a fingerprint pattern. Topological data, identifying singularity points such as tri-radii and cores, as well as ridge flow line tracings related to those points are extracted from the ridge contour data. The extracted information is used to automatically perform classification of the fingerprint patterns and/or matching of the fingerprint pattern with patterns stored in a mass file.

U.S. Pat. No. 5,845,005 to Setlak et al., and assigned to the assignee of the present invention, discloses a significant advance in the area of fingerprint indexing and searching of a database of reference fingerprints to determine a match. In particular, index values are calculated which are generally evenly distributed and continuous over a relatively large population of individuals. The index values may be determined based upon ridge flow curvature of the fingerprints. A particularly advantageous index, called a curliness index, is disclosed and this index is based upon an aggregate of a magnitude of a rate of change of ridge flow direction vectors.

Other important advances have also been made in the area of integrated circuit fingerprint sensors, as disclosed, for example, in U.S. Pat. Nos. 5,828,773 and 5,862,248, both assigned to the assignee of the present invention. The disclosed sensors are based upon generating an electric field which can sense the ridges of a fingerprint despite contamination, skin surface damage, and other factors. The sensor is relatively compact and rugged.

Despite improvements in sensor technology and in fingerprint enrollment and matching approaches, processing is still computationally intensive thus limits widespread use of fingerprint sensing. A large computational burden may slow matching operations and/or add significantly to the cost of a fingerprint sensor.

SUMMARY OF THE INVENTION

In view of the foregoing background, it is therefore an object of the present invention to provide a method and related fingerprint apparatus that has a reduced computational processing burden, such as for matching a new fingerprint to an enrolled fingerprint.

This and other objects, features and advantages in accordance with the present invention are provided in one embodiment by a method for enrolling at least one fingerprint and determining a match of a new fingerprint thereto using data related to fingerprint ridge flow, and wherein, for matching, a desired area segment of the new fingerprint is compared to a corresponding area segment stored in a database. Accordingly, the computations are greatly simplified. In particular, the method preferably comprises: generating and storing enrollment data based upon fingerprint ridge flow over a plurality of predetermined area segments for the at least one fingerprint, sensing a new fingerprint, and generating sensed data based upon fingerprint ridge flow of the new fingerprint over at least one desired area segment of the plurality of predetermined area segments. The method also preferably includes comparing the enrollment data and sensed data to determine whether the new fingerprint matches an enrolled fingerprint.

The step of generating sensed data preferably comprises identifying and generating sensed data for only a single desired area segment in one embodiment. In another embodiment, a plurality of area segments are identified and processed to achieve a desired performance. For example, the desired performance may comprise at least one of a desired false acceptance rate and a desired false reject rate. The data generated for the desired segment areas based upon ridge flow are advantageously statistically independent to thereby provide better matching accuracy.

The steps of generating enrollment data and sensed data may each comprise generating ridge flow direction vectors. More particularly, the steps of generating enrollment data and sensed data may each comprise generating aggregates of rates of change of fingerprint ridge flow direction vectors.

The step of sensing the new fingerprint may comprise sensing the new fingerprint over an entire fingerprint sensing area. Accordingly, the step of generating sensed data preferably comprises identifying and generating sensed data over only a portion of the entire fingerprint sensing area corresponding to the at least one desired area segment. In addition, the step of sensing the new fingerprint preferably comprises sensing the fingerprint using a fingerprint sensing integrated circuit, which is relatively compact and rugged.

Another aspect of the invention relates to a fingerprint sensing apparatus performing the method steps recited above. More particularly, the apparatus in one embodiment preferably comprises a fingerprint sensing area, and an enrollment circuit connected to the fingerprint sensing area for enrolling a fingerprint of a user by generating and storing enrollment data based upon fingerprint ridge flow over a plurality of predetermined area segments for the at least one fingerprint.

The fingerprint sensing apparatus may also preferably further include a match determining circuit. The match determining circuit determines a match of a new fingerprint to an enrolled fingerprint by sensing a new fingerprint using the fingerprint sensing area, and generating sensed data based upon fingerprint ridge flow of the new fingerprint over at least one desired area segment of the plurality of predetermined area segments. The match determining circuit preferably includes a comparor for comparing the enrollment data and sensed data to determine whether the new fingerprint matches an enrolled fingerprint.

In one embodiment, the match determining circuit preferably identifies and generates sensed data for only a single desired area segment. In another embodiment, the match determining circuit of the apparatus identifies and generates sensed data for a plurality of desired area segments to achieve a desired performance.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
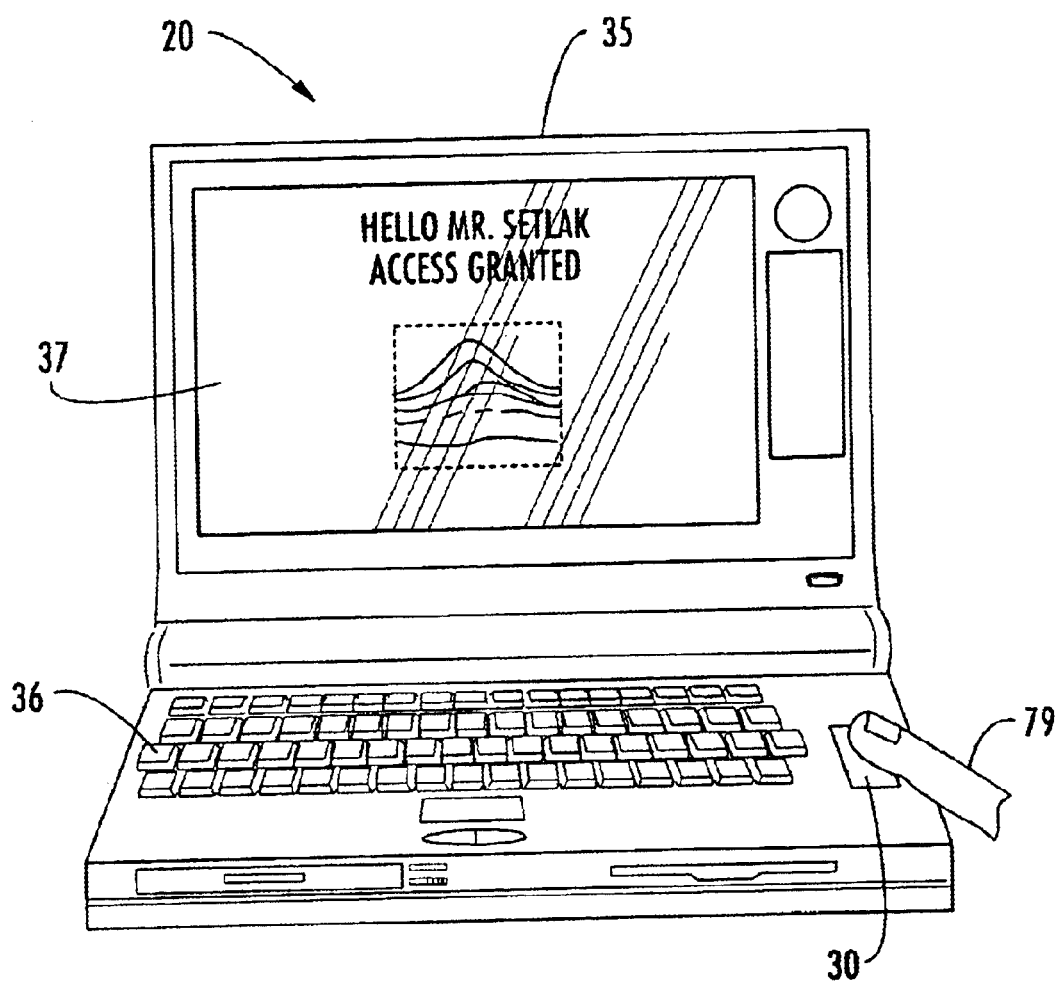
FIG. 1 is a perspective view of a laptop computer including a fingerprint sensor and associated processing software to define an embodiment of the fingerprint sensing apparatus in accordance with the present invention.
Figure 2:
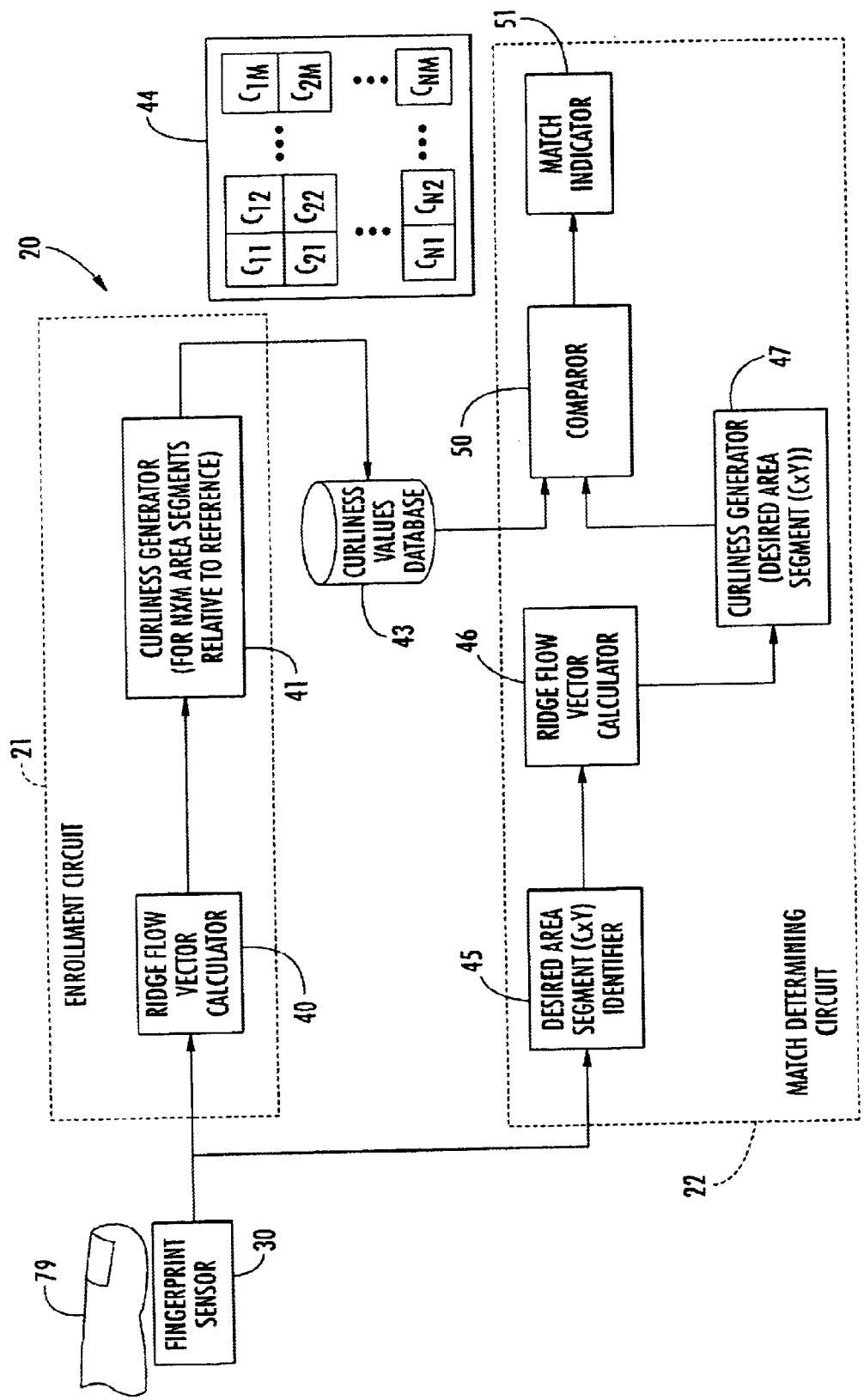
FIG. 2 is a schematic block diagram of the fingerprint sensing apparatus in accordance with the present invention.

Referring initially to FIGS. 1 and 2, the general components and features of the fingerprint sensing apparatus 20 of the present invention are now described. As shown in FIG. 1, the apparatus 20 in one embodiment includes a fingerprint sensor 30 mounted on the keyboard surface 36 of a laptop computer 35. The laptop computer 35 also illustratively includes a foldable display 37. Processing of fingerprint image data may be shared between processing circuitry on the fingerprint sensor 30 and the microprocessor of the computer as would be readily understood by those skilled in the art.

The invention may permit a properly authorized person to become enrolled into a security or access control procedure for the computer 35. One or more persons may be enrolled as will be described below. To use the computer 35 or to have access to certain files, the user's finger 79 is placed onto the fingerprint sensor 30 and a match is determined with respect to the enrolled authorized persons. If a match is not determined, then access to operate the computer 35 or access to certain files is denied as will be readily appreciated by those skilled in the art. Of course, if a match is determined, the person may be greeted by a visual or audible announcement, and access is granted.

The fingerprint sensor 30 may preferably be of a type that uses electric field sensing of the ridges and valleys of a live fingerprint. Moreover the fingerprint sensor is desirably relatively compact, especially for the application in combination with a laptop computer 35. For example, the fingerprint sensor 30 may an integrated circuit electric field sensor as offered by AuthenTec, the assignee of the present invention. Various features and attributes of suitable fingerprint sensors are described in U.S. Pat. Nos. 5,828,773; 5,862,248; and 5,940,526 and U.S. patent application Ser. No. 09/567,685, filed concurrently herewith, entitled "Fingerprint Sensor With Leadframe Bent Pin Conductive Path and Associated Methods", all assigned to the assignee of the present invention. The subject matter of each of these patents and patent application is incorporated herein by reference in its entirety.

Those of skill in the art will recognize that the apparatus 20 in accordance with the present invention can be implemented in a number of forms in addition to incorporation into the illustrated laptop computer 35 of FIG. 1. For example, the processing circuitry may be incorporated into the integrated circuit of the fingerprint sensor 30, or may be included in associated circuitry within an overall fingerprint sensor package.

Referring more particularly to FIG. 2, the illustrated apparatus 20 includes an enrollment circuit 21 and a match determining circuit 22. In some embodiments, either of these circuits may operate without the other; however, the illustrated curliness values database 43 is shared between the two circuits. The circuits 20,22 can be implemented in a microprocessor operating under stored program control as will be readily appreciated by those skilled in the art.

Fingerprint image information from the fingerprint sensor 30 is first processed in the ridge flow vector calculator 40. A curliness value generator 41 is connected downstream from the ridge flow vector calculator 40. In particular, the curliness value generator 41 produces a plurality of curliness values $C_{11}$ to $C_{NM}$ for a matrix 44 of area segments of N×M such segments relative to a frame of reference or reference point, such as the fingerprint core location.

Calculation of the ridge flow vectors and curliness values is described more fully in U.S. Pat. No. 5,845,005, the entire disclosure of which is incorporated herein by reference. As disclosed in the patent, the ridge flow direction vectors may first be calculated. The magnitude of the vectors may be optionally calculated, and an aggregate of the ridge flow direction vectors is calculated to define the curliness value.

The curliness value may be considered as somewhat similar to a Reynolds number used in fluid dynamics. A higher value of Reynolds number indicates higher turbulence in the flow of a fluid. Similarly, a higher value of the curliness value would indicate more changes in directions in the ridges, that is, a more turbulent pattern.

Calculation of the curliness value can be represented as follows:

$$\xi = \frac{1}{q} \int \int \Delta\theta(x', y') \partial x \partial y$$
$$r_1^2 \leq x'^2 + y'^2 \leq r_2^2$$

where:
$\xi$=Curliness value
$\theta$=Local Ridge Direction Angle
$r_1$=Inner Radius of the Evaluation Region
$r_2$=Outer Radius of the Evaluation Region
q=fingerprint quality index=percent of evaluation region that contains usable ridge direction data, and
x', and y' are coordinates normalized to originate at the calculated center of the fingerprint pattern.

It has been found in accordance with the invention that the computations required for determining curliness values and matching a new fingerprint to the database of curliness values is relatively straightforward, especially, for example, in comparison to conventional minutiae determination and matching.

Those of skill in the art will recognize that other values relating to ridge flow may also be used, as the ridge flow data has been found to be relatively statistically independent from one segment area to another. As shown in the block 41 of the right hand portion of FIG. 2, the curliness values are assigned or associated to specific area segments of the fingerprint. During enrollment of one or more authorized persons' fingerprints, the curliness values are calculated and stored in the illustrated database 43 for later searching.

Referring now more particularly to the lower portion of FIG. 2, the match determining circuit 22 is further described. This circuit 22 is shown connected to the same fingerprint sensor 30, as will typically be the case. However, in other embodiments, a different fingerprint sensor, and perhaps having a different sensing area, may also be used.

The fingerprint sensor 30 is connected to the desired area segment identifier block 45. For example, this block 45 may examine the fingerprint image created by the fingerprint sensor 30 and select only the desired area segment, such as based upon location to the fingerprint core, to reduce the calculation complexity. Determination of the fingerprint core is well understood by those skilled in the art, and, hence, requires no further discussion herein.

Downstream from the desired area segment identifier 45 the ridge flow vector calculator 46 is connected to the curliness value generator 47 which generates the curliness value ($C_{XY}$) for the desired area segment. Since the desired area segment is relatively small, the number of computations is further reduced. Accordingly, quick matching may be performed and at a relatively low cost.

The curliness value generator 47 is connected to the comparor 50 which, in turn, is also connected to the database 43. The comparison can be made based upon a number of criteria, such as how close the curliness value for the new fingerprint matches to the stored values as will be readily understood by those skilled in the art.

If a correct match between the new fingerprint and one stored in the database 43 is determined in the comparor 50, such may be indicated by the schematically illustrated match indicator 51. For example, the match indicator 51 may produce a message on the display screen 37 of the laptop computer 35. Alternately or in addition thereto, a match indication may be indicated simply by granting the user access or permission to continue.

Figure 3:
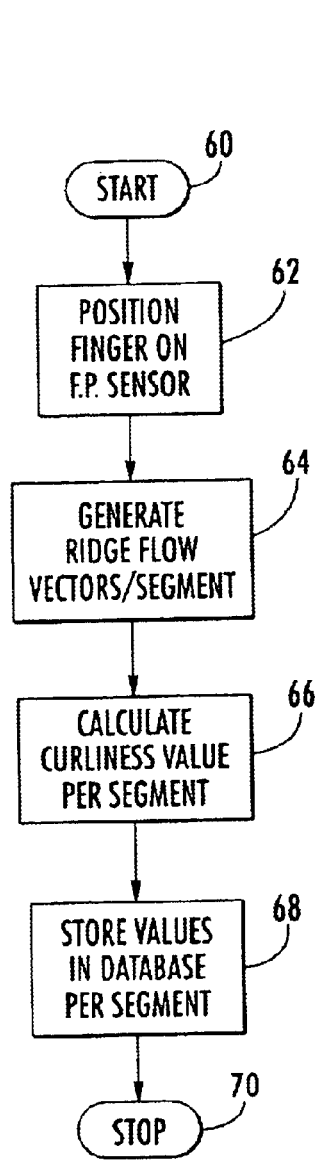
FIG. 3 is a flow chart of a method for enrolling a person's fingerprint into the database in accordance with the present invention.

Turning now to the flow chart of FIG. 3, the method steps for enrolling a fingerprint of a user are now described in greater detail. From the start (Block 60) the user positions or places his finger on the fingerprint sensor 30 at Block 62. The fingerprint sensor 30 may have an area sufficient to image the entire fingerprint area of interest. Alternately, a number of different finger placements may be used to generate a composite image as described in copending U.S. patent application Ser. No. 09/567,245 filed concurrently herewith and entitled "Fingerprint Image Compositing Method and Associated Apparatus", assigned to the assignee of the present invention, and the entire disclosure of which is incorporated by reference herein.

At Block 64 the ridge flow vectors are calculated for each area segment of an N×M segment matrix. The curliness values, in the illustrated embodiment, are calculated at Block 66 and these are stored in the database 43 at Block 68 before the enrollment program stops (Block 70).

Figure 4:
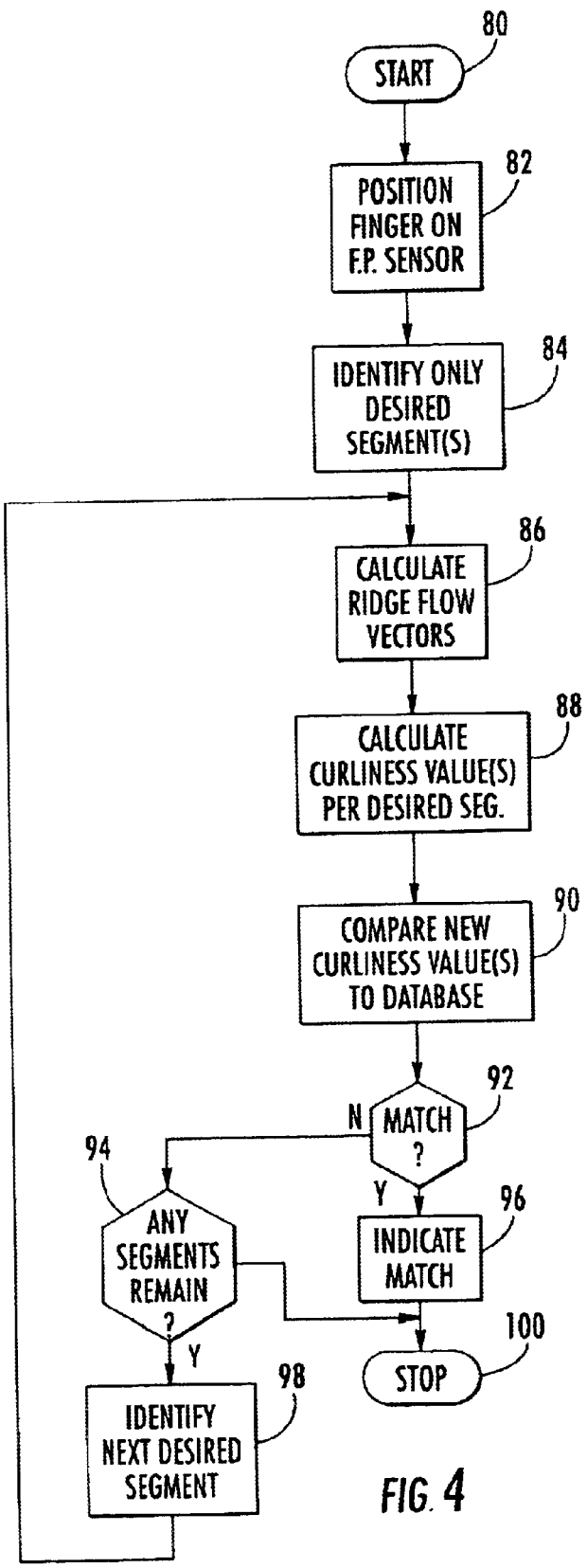
FIG. 4 is a flow chart of a method for comparing a new fingerprint to the database to determine a match in accordance with the present invention.

Turning now additionally to the flow chart of FIG. 4, the method of matching a new fingerprint is described in greater detail. From the start (Block 80), the user's finger 79 is positioned on the fingerprint sensor,30 at Block 82. The desired area segment from the fingerprint image is identified at Block 84. The ridge flow vectors are calculated at Block 86 and the curliness value is generated at Block 88. The new curliness value for the new fingerprint is compared to the values in the database 43 based upon the corresponding area segment at Block 90. If a match is determined at Block 92, a match is indicated at Block 96 before the process terminates (Block 100).

If a match is not determined at Block 92, then in one embodiment of the invention, another curliness value for another desired area segment may be considered against the database as will be readily appreciated by those skilled in the art. At Block 94 it is determined whether there are any additional area segments to be considered and if so, the next desired segment area may be identified (Block 98) and processed starting again with the calculation of ridge flow vectors (Block 86).

Figure 5:
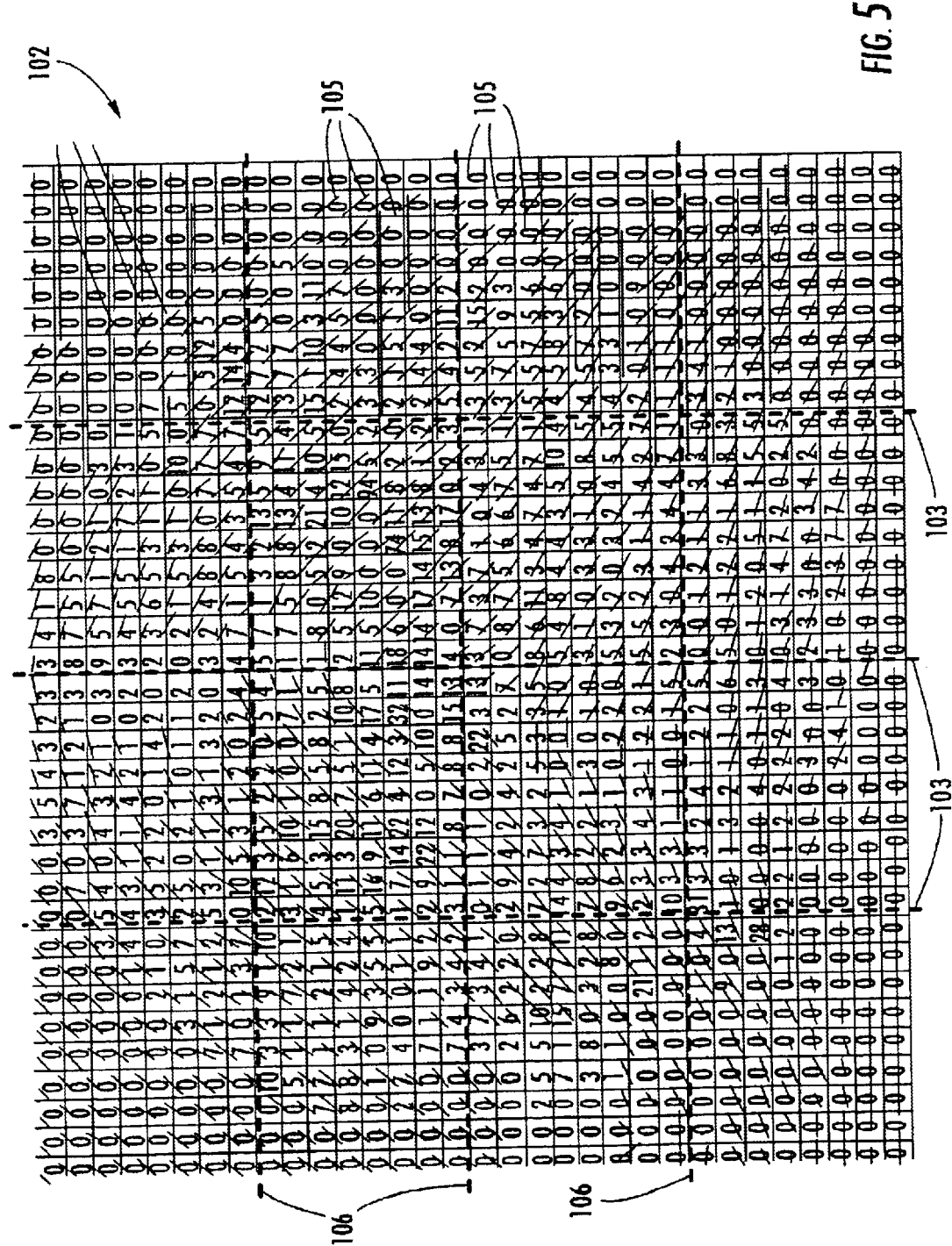
FIG. 5 is a table and image illustrating ridge flow direction vectors for enrolling a fingerprint and divided into area segments in accordance with the present invention.
Figure 6:
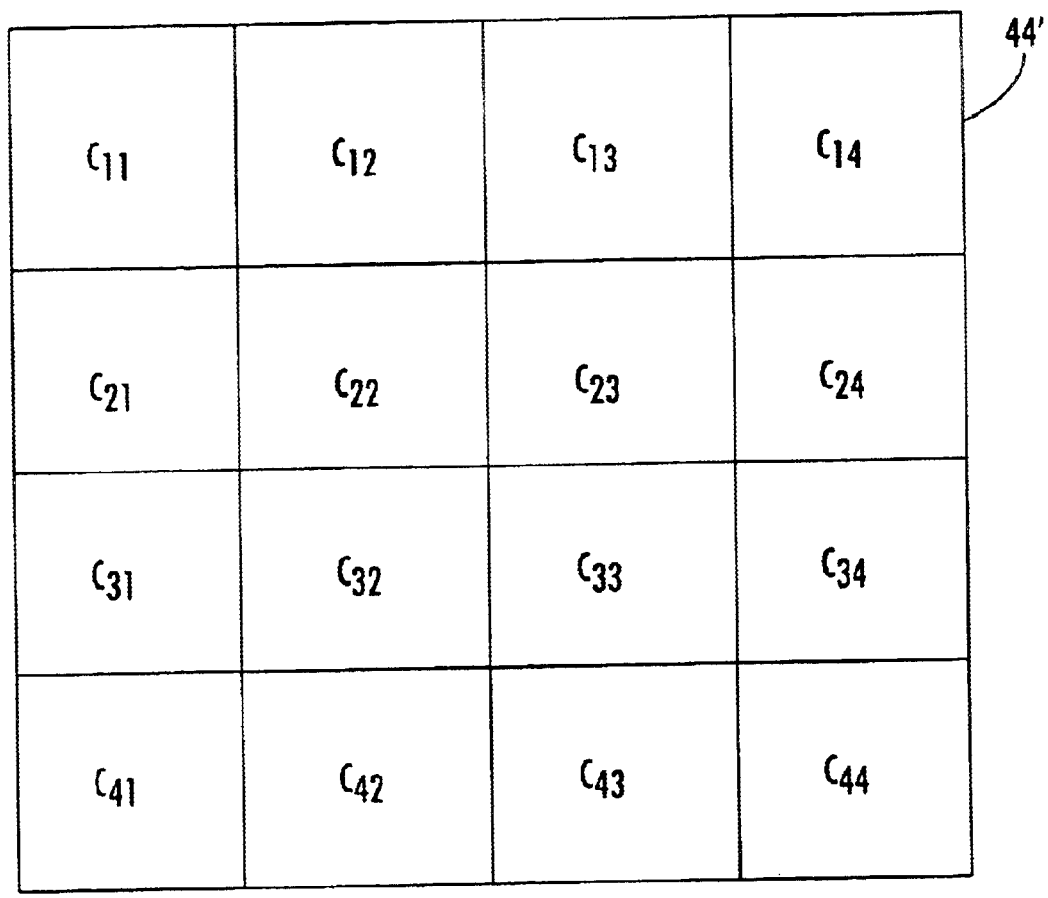
FIG. 6 is an table representing the different area segments as shown in FIG. 5 with curliness values indicated therein in accordance with an embodiment of the present invention.

Referring now to FIGS. 5 and 6, a representative partially processed fingerprint image 102 and further processing thereof is further explained. FIG. 5 illustrates the ridge flow vectors 105 of a fingerprint image generated by the sensing area of the fingerprint sensor 30. The dashed vertical lines 103 and dashed horizontal lines 106 divide the image into adjacent area segments. As shown in FIG. 6, curliness values $C_{11}$ to $C_{44}$ are shown in a matrix 44' in relation to the area segments.

Figure 7:
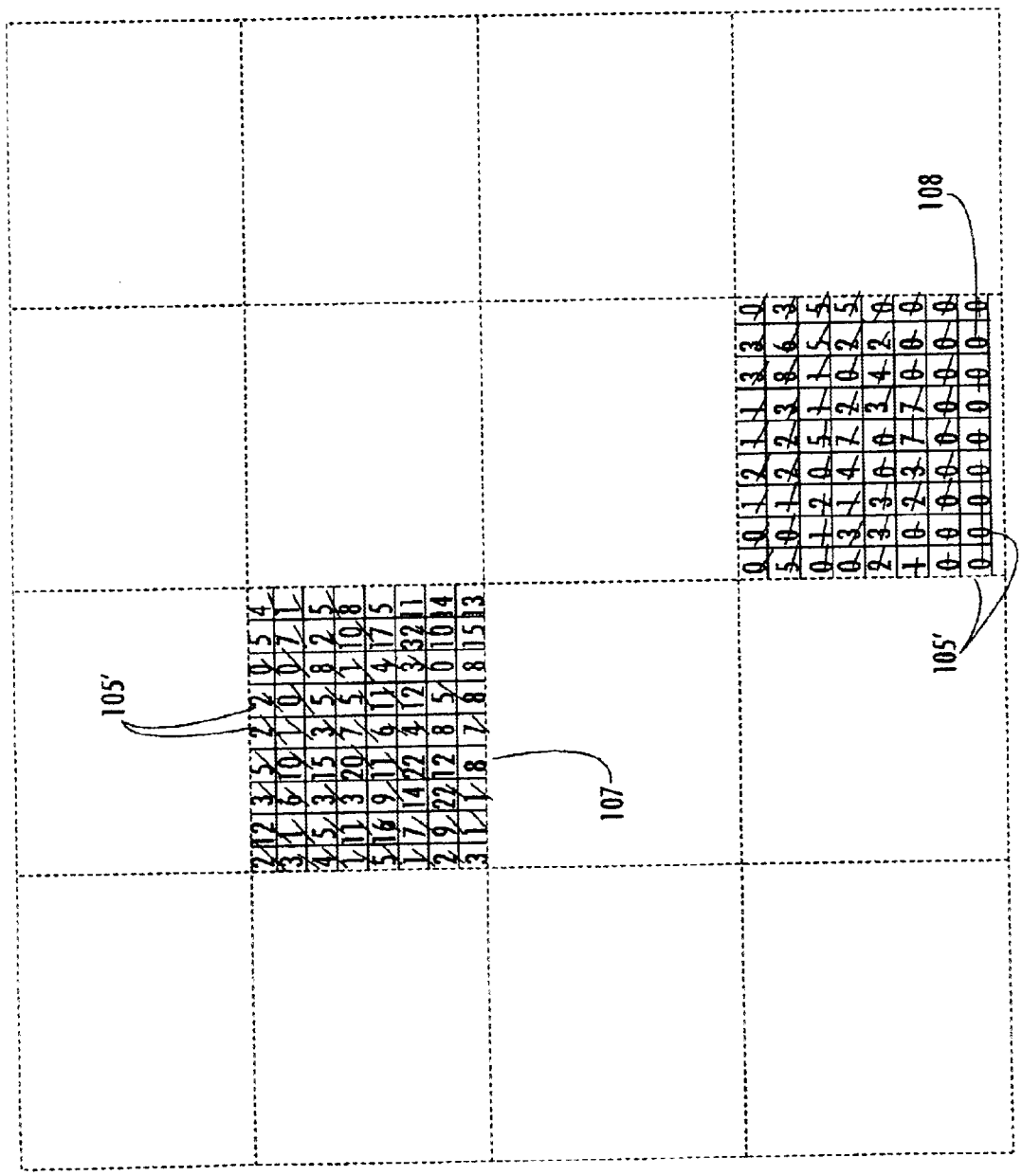
FIG. 7 is a table and image of two area segments from a new fingerprint and illustrating the ridge flow direction vectors during matching in accordance with the present invention.
Figure 8:
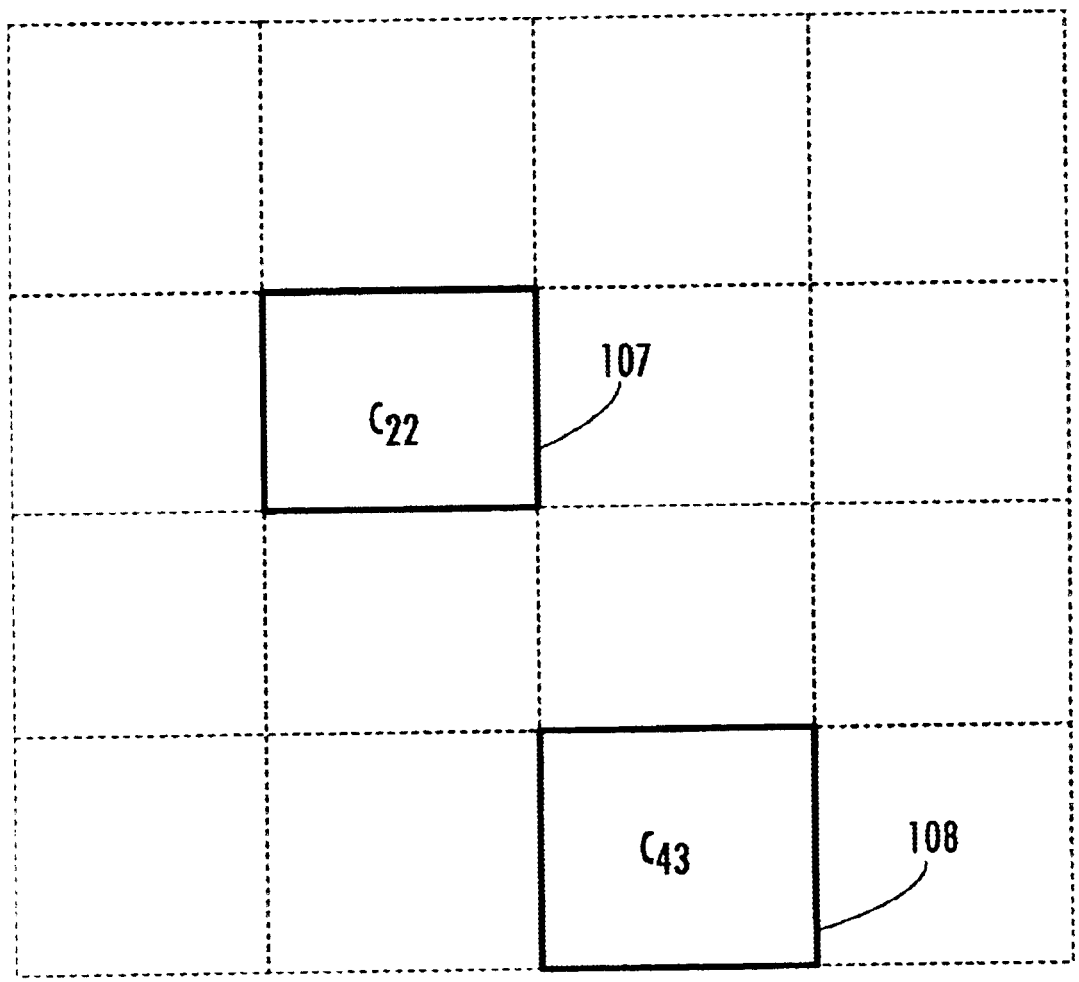
FIG. 8 is a table representing the curliness values from FIG. 7 in relation to the overall enrolled fingerprint area.

Turning now to FIG. 7, a first desired segment area 107, with ridge flow direction vectors 105' therein, is shown as would be generated during matching. A second desired segment area 108 is also shown. The second desired area segment 108 may be used during a second iteration of the matching process, for example. Alternately, two or more of the area segments may be processed in a first processing pass. The size of the area segments and number thereof to be processed simultaneously or sequentially for matching can be determined based on a desired performance parameter. For example, the performance parameter may be one of a false acceptance rate or a false rejection rate as will be readily understood by those skilled in the art. The respective curliness values $C_{22}$ and $C_{43}$ are shown in relation to the matrix of such possible values in FIG. 8.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for enrolling at least one fingerprint and determining a match of a new fingerprint thereto, the method comprising:

generating and storing enrollment data based upon fingerprint ridge flow over a plurality of predetermined area segments for the at least one fingerprint;

sensing a new fingerprint;

generating sensed data based upon fingerprint ridge flow of the new fingerprint over a plurality of spaced-apart desired area segments of the plurality of predetermined area segments; and comparing the enrollment data and sensed data to determine whether the new fingerprint matches an enrolled fingerprint.

2. A method according to claim 1 wherein generating sensed data comprises identifying and generating sensed data for a plurality of desired area segments to achieve a desired performance.

3. A method according to claim 2 wherein the desired performance comprises at least one of a desired false acceptance rate and a desired false reject rate.

4. A method according to claim 1 wherein generating enrollment data and sensed data each comprises generating ridge flow direction vectors.

5. A method according to claim 1 wherein generating enrollment data and sensed data each comprises generating aggregates of rates of change of fingerprint ridge flow direction vectors.

6. A method according to claim 1 wherein sensing the new fingerprint comprises sensing the new fingerprint over an entire fingerprint sensing area; and wherein generating sensed data comprises identifying and generating sensed data over only a portion of the entire fingerprint sensing area corresponding to the at least one desired area segment.

7. A method according to claim 1 wherein sensing the new fingerprint comprises sensing the fingerprint using a fingerprint sensing integrated circuit.

8. A method for using a fingerprint sensor comprising:

enrolling at least one fingerprint by
      sensing the at least one fingerprint using the fingerprint sensor, and
      generating and storing enrollment data based upon fingerprint ridge flow over a plurality of predetermined area segments for the at least one fingerprint; and sensing a new fingerprint using the fingerprint sensor;

generating sensed data based upon fingerprint ridge flow of the new fingerprint over a plurality of spaced-apart desired area segments of the plurality of predetermined area segments; and comparing the enrollment data and sensed data to determine whether the new fingerprint matches an enrolled fingerprint.

9. A method according to claim 8 wherein generating sensed data comprises identifying and generating sensed data for a plurality of desired area segments to achieve a desired performance.

10. A method according to claim 9 wherein the desired performance comprises at least one of a desired false acceptance rate and a desired false reject rate.

11. A method according to claim 8 wherein generating enrollment data comprises generating ridge flow direction vectors.

12. A method according to claim 8 wherein generating enrollment data comprises generating aggregates of rates of change of fingerprint ridge flow direction vectors.

13. A method according to claim 8 wherein sensing the new fingerprint comprises sensing the new fingerprint over an entire fingerprint sensing area of the fingerprint sensor; and wherein the step of generating sensed data comprises identifying and generating sensed data over only a portion of the entire fingerprint sensing area corresponding to the at least one desired area segment.

14. A method according to claim 8 wherein the fingerprint sensor comprises a fingerprint sensing integrated circuit.

15. A method for matching a new fingerprint to an enrolled fingerprint, the enrolled fingerprint represented by enrollment data based upon fingerprint ridge flow over a plurality of predetermined area segments, the method comprising:

sensing a new fingerprint;

generating sensed data based upon fingerprint ridge flow of the new fingerprint over a plurality of spaced-apart desired area segments of the plurality of predetermined area segments; and comparing the enrollment data and sensed data to determine whether the new fingerprint matches an enrolled fingerprint.

16. A method according to claim 15 wherein generating sensed data comprises identifying and generating sensed data for a plurality of desired area segments to achieve a desired performance.

17. A method according to claim 16 wherein the desired performance comprises at least one of a desired false acceptance rate and a desired false reject rate.

18. A method according to claim 15 wherein generating sensed data comprises generating ridge flow direction vectors.

19. A method according to claim 15 wherein generating sensed data comprises generating aggregates of rates of change of fingerprint ridge flow direction vectors.

20. A method according to claim 15 wherein sensing the new fingerprint comprises sensing the new fingerprint over an entire fingerprint sensing area of a fingerprint sensor; and wherein generating sensed data comprises identifying and generating sensed data over only a portion of the entire fingerprint sensing area corresponding to the at least one desired area segment.

21. A method according to claim 15 wherein sensing the new fingerprint comprises sensing the new fingerprint using a fingerprint sensing integrated circuit.

22. A fingerprint sensing apparatus comprising:

a fingerprint sensing area;

an enrollment circuit connected to said fingerprint sensing area for enrolling a fingerprint of a user by generating and storing enrollment data based upon fingerprint ridge flow over a plurality of predetermined area segments for the at least one fingerprint; and a match determining circuit for determining a match of a new fingerprint to an enrolled fingerprint by sensing a new fingerprint using the fingerprint sensing area, and generating sensed data based upon fingerprint ridge flow of the new fingerprint over a plurality of spaced apart desired area segments of the plurality of predetermined area segments, wherein said match determining circuit comprises a comparor for comparing the enrollment data and sensed data to determine whether the new fingerprint matches an enrolled fingerprint.

23. A fingerprint sensing apparatus according to claim 22 wherein said match determining circuit identifies and generates sensed data for a plurality of desired area segments to achieve a desired performance.

24. A fingerprint sensing apparatus according to claim 23 wherein the desired performance comprises at least one of a desired false acceptance rate and a desired false reject rate.

25. A fingerprint sensing apparatus according to claim 22 wherein said enrollment circuit and said match determining circuit each generate ridge flow direction vectors.

26. A fingerprint sensing apparatus according to claim 22 wherein said enrollment circuit and said match determining circuit each generate aggregates of rates of change of fingerprint ridge flow direction vectors.

27. A fingerprint sensing apparatus according to claim 22 wherein the match determining circuit senses the new fingerprint over the entire fingerprint sensing area; and wherein the match determining circuit identifies and generates sensed data over only a portion of the entire fingerprint sensing area corresponding to the at least one desired area segment.

28. A fingerprint sensing apparatus according to claim 22 wherein the fingerprint sensing area comprises a fingerprint sensing integrated circuit.

29. A fingerprint sensing apparatus comprising:

a fingerprint sensor including a fingerprint sensing area;

an enrollment circuit connected to said fingerprint sensing area for enrolling a fingerprint of a user by generating and storing enrollment data based upon fingerprint ridge flow over a plurality of predetermined area segments for the at least one fingerprint; and a match determining circuit for determining a match of a new fingerprint to an enrolled fingerprint by sensing a new fingerprint using the fingerprint sensing area, and generating sensed data based upon fingerprint ridge flow of the new fingerprint over a plurality of spaced apart desired area segments of the plurality of predetermined area segments, wherein said match determining circuit comprises a comparor for comparing the enrollment data and sensed data to determine whether the new fingerprint matches an enrolled fingerprint.

30. A fingerprint sensing apparatus according to claim 29 wherein said match determining circuit identifies and generates sensed data for a plurality of desired area segments to achieve a desired performance.

31. A fingerprint sensing apparatus according to claim 29 wherein the desired performance comprises at least one of a desired false acceptance rate and a desired false reject rate.

32. A fingerprint sensing apparatus according to claim 29 wherein said enrollment circuit and said match determining circuit each generate ridge flow direction vectors.

33. A fingerprint sensing apparatus according to claim 29 wherein said enrollment circuit and said match determining circuit each generate aggregates of rates of change of fingerprint ridge flow direction vectors.

34. A fingerprint sensing apparatus according to claim 29 wherein the match determining circuit senses the new fingerprint over the entire fingerprint sensing area; and wherein the match determining circuit identifies and generates sensed data over only a portion of the entire fingerprint sensing area corresponding to the at least one desired area segment.

35. A fingerprint sensing apparatus according to claim 29 wherein the fingerprint sensor comprises a fingerprint sensing integrated circuit.

* * * * *